(12) United States Patent
Li et al.

(10) Patent No.: US 12,596,898 B1
(45) Date of Patent: Apr. 7, 2026

(54) VEHICLE-BASED QUICK RESPONSE CODE SCANNING METHOD

(71) Applicant: GM GLOBAL TECHNOLOGY OPERATIONS LLC, Detroit, MI (US)

(72) Inventors: Chuan Li, Troy, MI (US); Jinzhu Chen, Troy, MI (US); Bo Yu, Troy, MI (US); Fan Bai, Ann Arbor, MI (US); Brittany L. Pletscher, Oakland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 18/975,277

(22) Filed: Dec. 10, 2024

(51) Int. Cl.
| | |
|---|---|
| G06K 7/14 | (2006.01) |
| G06Q 20/32 | (2012.01) |
| G06V 20/56 | (2022.01) |
| H04N 23/69 | (2023.01) |

(52) U.S. Cl.
CPC ....... G06K 7/1417 (2013.01); G06Q 20/3276 (2013.01); G06V 20/56 (2022.01); H04N 23/69 (2023.01)

(58) Field of Classification Search
CPC ...... G06K 7/1417; G06V 20/56; H04N 23/69; G06Q 20/3276
USPC ....................................................... 235/494
See application file for complete search history.

(56) References Cited

U.S. PATENT DOCUMENTS

| | | | | |
|---|---|---|---|---|
| 11,667,474 | B1 * | 6/2023 | Ferdosali | G06V 30/1465 |
| | | | | 700/230 |
| 2011/0150346 | A1 * | 6/2011 | Panetta | G06V 30/1429 |
| | | | | 382/218 |

| | | | | |
|---|---|---|---|---|
| 2012/0091204 | A1 * | 4/2012 | Shi | G06K 7/1465 |
| | | | | 235/437 |
| 2019/0131695 | A1 * | 5/2019 | Thiruvarankan | H01Q 1/38 |
| 2019/0251847 | A1 * | 8/2019 | Wu | G08G 1/056 |

(Continued)

FOREIGN PATENT DOCUMENTS

| | | |
|---|---|---|
| DE | 102017128294 A1 | 6/2018 |
| DE | 102019003903 A1 | 1/2020 |

(Continued)

OTHER PUBLICATIONS

"Recognition system for QR code on moving car"; The 10th International Conference on Computer Science & Education (ICCSE 2015); Jul. 22-24, 2015. Fitzwilliam College, Cambridge University, UK.

*Primary Examiner* — Allyson N Trail
(74) *Attorney, Agent, or Firm* — Quinn IP Law

(57) ABSTRACT

A method for scanning of a quick response (QR) code, executable by a processor aboard a vehicle during a vehicle-merchant transaction, includes collecting camera data of the QR code when displayed on a display screen of an infrastructure node, using a camera mounted to a vehicle, while the vehicle is in motion relative to the display screen. The method includes transmitting the camera data to a processor of a camera control system, processing the camera data via the processor of the camera control system to determine characteristics of the camera data, and performing a multi-factor health check of the QR code. The method also includes executing a control action of the camera and/or the vehicle in response to a value of one or more of the characteristics being less than a corresponding threshold of the multi-factor health check.

20 Claims, 7 Drawing Sheets

(56)          References Cited

U.S. PATENT DOCUMENTS

| | | | |
|---|---|---|---|
| 2019/0294844 A1 | 9/2019 | Burkhart et al. | |
| 2019/0325379 A1* | 10/2019 | Medina | A47L 11/28 |
| 2020/0082452 A1* | 3/2020 | Malaprade | G06K 19/06037 |
| 2020/0096349 A1* | 3/2020 | Black | G01C 21/383 |
| 2021/0033697 A1* | 2/2021 | Vyunova | G01S 5/02527 |
| 2021/0065272 A1* | 3/2021 | Phillips | G06Q 30/0185 |
| 2021/0125370 A1* | 4/2021 | Wang | G06T 7/74 |
| 2021/0133410 A1* | 5/2021 | Wang | G06K 7/10801 |
| 2022/0036586 A1* | 2/2022 | Landron | H04N 23/61 |
| 2022/0116673 A1* | 4/2022 | Cho | G06Q 30/0265 |
| 2022/0164557 A1* | 5/2022 | Rossetto | G06V 10/17 |
| 2023/0036188 A1* | 2/2023 | Schmidt | G06Q 20/3224 |
| 2023/0222907 A1* | 7/2023 | Clifford | G08G 1/0141 |
| | | | 701/26 |
| 2024/0030052 A1 | 1/2024 | Yoon et al. | |
| 2024/0113496 A1* | 4/2024 | Blasczak | H01S 5/0232 |
| 2024/0143804 A1* | 5/2024 | Mitschker | G06F 3/14 |
| 2025/0054345 A1* | 2/2025 | Sharma | G07C 5/0825 |
| 2025/0182651 A1* | 6/2025 | Handshaw | G06V 30/1437 |

FOREIGN PATENT DOCUMENTS

| | | |
|---|---|---|
| DE | 202014011407 | 4/2020 |
| DE | 102022111552 A1 | 11/2022 |

* cited by examiner

200

B202 Camera parameter tuning

B204 Function pattern recognition

B205 Move closer to QR code

Failed

Succeeded

B206 Module center line health check

B207 $\|l_l - l_r\| > \theta$ ?

Yes

No

B208 Vehicle placement to reduce $\|l_l - l_r\|$

B210 Distance checks via per module pixel counts

No

Yes

B212 Both skewness & pixel count are good

B214 QR code decode

A Sub-Region of a QR Code

Very Far Away
Not Ideal

Medium Distance
Okay

Close Enough
Optimal

VEHICLE-BASED QUICK RESPONSE CODE SCANNING METHOD

INTRODUCTION

The present disclosure relates to automated methods for optimizing quick response (QR) code scanning in a vehicle using one or more vehicle cameras. QR codes are two-dimensional barcodes that store information, for instance a web site address, plain text, contact information, menus, and the like. The information is first converted into binary data and thereafter encoded into a pixilated black and white pattern. In a typical QR code, three large squares are disposed in the QR code's corners to enable the QR code to be identified and properly oriented by a QR code scanner, e.g., a camera of a smartphone or, in the present application, of a vehicle. Smaller squares of the QR code are used to help correct distortion. QR codes also include version information corresponding to the QR code's module size/data capacity, as well as data and error correction keys forming encoded information and associated error correction codes.

To scan a QR code, a camera of a scanning device discovers and views the QR code, which in turn may be presented on a display screen or printed in a tangible form, e.g., on the surface of a sticker, product, sign, or menu. Image processing software of the scanning device locates the QR code in the camera's field of vision and orients the QR code before decoding the above-noted binary data. If necessary, error correction may be applied prior to decoding. Depending on the nature of the encoded data, the scanning device may respond to successful decoding of the information by performing or requesting performance of one or more actions, such as but not included to opening a website, displaying text, adding contact information, or performing a myriad of other possible actions.

SUMMARY

Disclosed herein are methods and systems for achieving accurate quick response (QR) code scanning results using one or more cameras of vehicle when the camera scans a QR code that is displayed at a roadside kiosk, toll booth, drive-through merchant, or other infrastructure node. The present solutions achieve successful QR code scanning via camera parameter tuning and a real-time QR code "health check". In order to obtain a healthy QR code, the approach set forth herein makes decisions on whether a vehicle position change is needed. Using optional crowdsourced QR code locations, a camera control system of the vehicle is alerted to a better or more feasible location for correct QR code readings. Among other possible benefits, the present strategy minimizes premature failure alerts and unnecessary user action requests.

In a representative scenario, a display screen operable for displaying the QR code is connected to or collocated with the above-noted infrastructure node. In a traditional QR code-based transaction, a camera, e.g., of a smartphone, is adjusted by the user such that the camera is placed near to and directly facing the QR code. This action enables the camera and associated software to properly scan and decode the displayed QR code. However, a use scenario is envisioned herein in which the vehicle and its vehicle-mounted camera(s) are in motion relative to the display screen/infrastructure node. An important consideration during such a scenario is whether the QR code is sufficient at the current position of the vehicle and camera, or whether it would be prudent to wait and/or change position of the vehicle/camera before re-scanning. Using the present teachings, an onboard camera control system may address this consideration by selectively adjusting camera settings, leveraging crowd-sourcing, and taking advantage of the above-noted QR code health check functions (e.g., skewness and distance) to ensure proper vehicle placement for optimal decoding of the QR code's information.

In particular, a method is disclosed herein for scanning of a QR code during a vehicle-merchant transaction. An embodiment of the method includes collecting camera data of the QR code when displayed on a display screen of an infrastructure node, using a camera mounted to a vehicle, while the vehicle is in motion relative to the display screen. The method may also include transmitting the camera data to a processor of a camera control system, processing the camera data via the processor of the camera control system to determine characteristics of the camera data, and per-forming a multi-factor health check of the QR code. The method also includes executing a control action of the camera and/or the vehicle in response to a value of one or more of the characteristics being less than a corresponding threshold of the multi-factor health check.

A factor of the multi-factor health check may include a clarity of the image data, in which case the control action may include adjusting a setting of the camera to optimize the scanning of the QR code. Adjusting the setting of the camera for its part may include adjusting one or more of a sharpness setting, a brightness setting, or a size setting. Adjusting the sharpness setting or the brightness setting may include adjusting a shutter speed of the camera, while adjusting the size setting may include adjusting a zoom level of the camera.

In one or more embodiments, a factor of the multi-factor health check includes a viewing angle of the QR code. The control action may include adjusting a pan setting and/or a tilt setting of the camera when the viewing angle exceeds a predetermined viewing angle as the corresponding thresh-old. Adjusting the pan setting and/or the tilt setting of the camera may include transmitting a motor control signal to a camera motor of the camera via the processor.

In a possible implementation, executing the control action includes causing a change in a location of the vehicle relative to the QR code when the viewing angle exceeds a viewing angle threshold. For instance, the vehicle may be constructed as an autonomous vehicle, and causing the change in the location of the vehicle relative to the QR code may include controlling a steering and/or propulsion state of the autonomous vehicle via the processor. Causing the change in the location of the vehicle relative to the QR code alternatively may include prompting a driver of the vehicle, via a human-machine interface, to change a steering and/or propulsion state of the vehicle.

The method may include receiving crowdsourced data indicative of prior scanning locations of the QR code, processing the crowdsourced data via the processor of the camera control system to determine an optimal placement region of the vehicle, and controlling the state of the vehicle such that the vehicle is directed to the optimal placement region. Embodiments of the method include determining a QR code version of the QR code via the processor, calcu-lating a per module pixel count as a function of the QR code version, and decoding the QR code via the processor when the per module pixel count exceeds a predetermined per module pixel count threshold.

A camera control system is also disclosed herein that is operable for scanning of a QR code during a vehicle-merchant transaction. The camera control system includes a vehicle-mounted camera, a processor, and a computer storage medium ("memory") on which is recorded instructions. Execution of the instructions by the processor to cause the camera control system to collect camera data of the QR code via the vehicle-mounted camera when the QR code is displayed on a display screen of an infrastructure node and the vehicle is in motion relative to the display screen, process the camera data via the processor to determine characteristics of the camera data, and perform a multi-factor health check of the QR code. Execution of the instructions also causes the processor to execute a control action of the camera and/or the vehicle in response to a value of one or more of the characteristics being less than a corresponding threshold of the multi-factor health check.

The above and other features and advantages of this disclosure will be readily apparent from the following detailed description of illustrative examples and modes for carrying out the present disclosure when taken in connection with the accompanying drawings and the appended claims. Moreover, this disclosure expressly includes combinations and sub-combinations of the elements and features presented above and below.

Figures 1, 2:
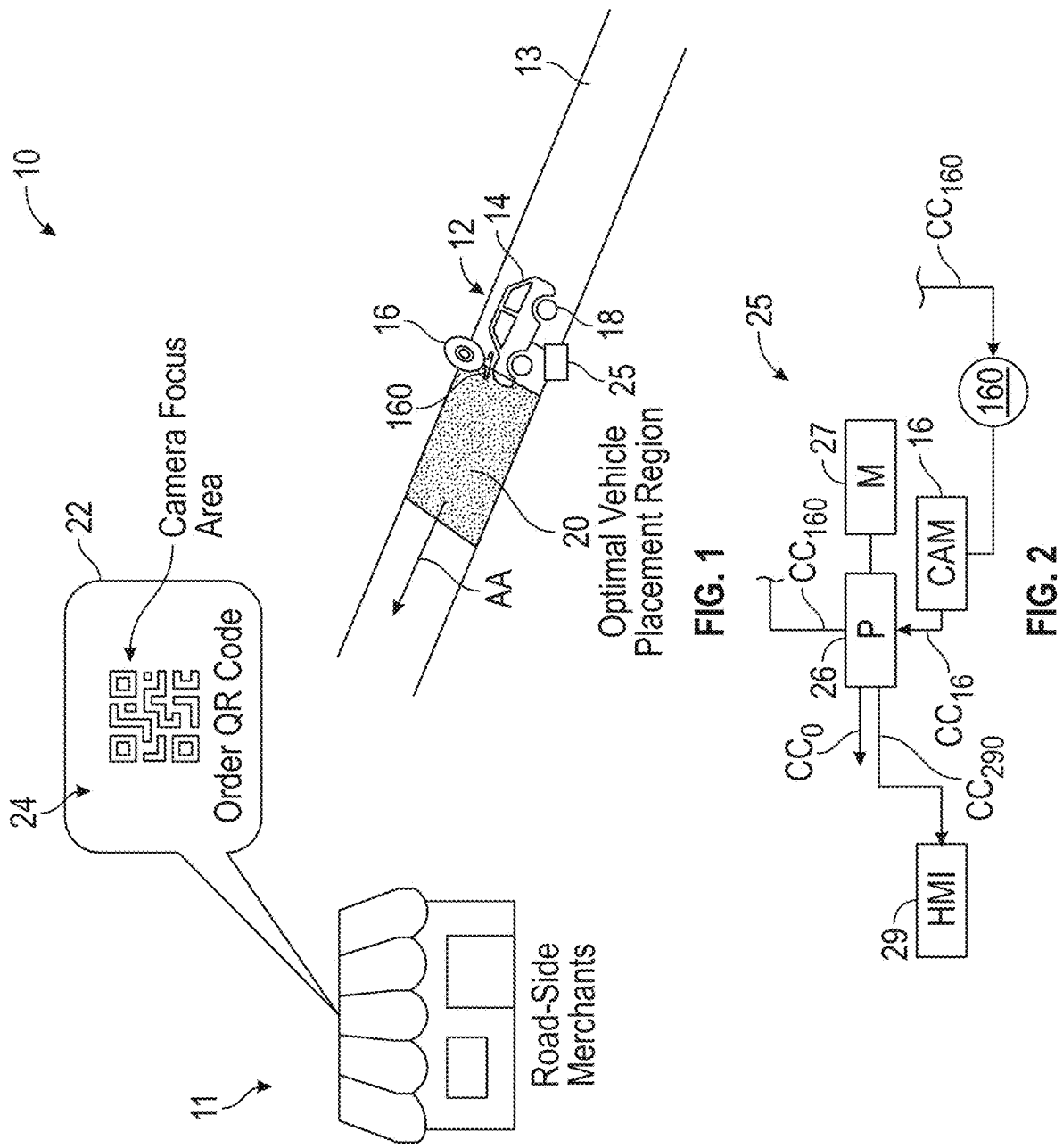
FIG. 1 is an illustration of an exemplary operating scenario in which a moving vehicle reads a displayed quick response (QR) code from a display screen of an infrastructure node with the assistance of programmed function of an onboard camera control system.
FIG. 2 illustrates an exemplary camera control system usable with the vehicle of FIG. 1.

The present disclosure may be modified or embodied in alternative forms, with representative embodiments shown in the drawings and described in detail below. Inventive aspects of the present disclosure are not limited to the disclosed embodiments. Rather, the present disclosure is intended to cover alternatives falling within the scope of the disclosure as defined by the appended claims.

DETAILED DESCRIPTION

Referring to the drawings, wherein like reference numbers refer to like features throughout the several views, FIG. 1 illustrates a networked architecture 10 having an infrastructure node 11 and vehicle 12, the latter of which is shown traveling along a road surface 13 in the direction of arrow AA. Travel in the indicated direction will eventually place the vehicle 12 within an optimal placement region 20 relative to the infrastructure node 11. Determination of the optimal placement region 20 and other decisions are made in accordance with the present disclosure as set forth below with reference to FIGS. 2-9.

The vehicle 12 may include a vehicle body 14 and a set of road wheels 18. In the vehicle-merchant transactions considered herein, the vehicle 12 is in motion relative to the infrastructure node 11, for instance a roadside kiosk, toll-booth, store, or another drive-through/drive-by structure acting as a point-of-sale/point-of-transaction. Within the scope of the present disclosure, the vehicle 12 includes one or more vehicle-mounted cameras 16. Each camera 16 is securely mounted to the vehicle body 14, e.g., to a rearview mirror, dashboard, windshield, or other forward-facing location. The camera 16 may also be equipped in some embodiments with a camera motor 160, e.g., a motorized gimbal system and/or servomotor(s), with vertical and horizontal axis control of the camera 16 provided by the camera motor 160 in one or more embodiments, e.g., in response to motor control signals ($CC_{160}$) (see FIG. 2).

During propulsion modes of the vehicle 12, one or more of the road wheels 18 may be driven by torque from an internal combustion engine, electric traction motor, or other prime mover (not shown). In such embodiments, powered rotation of the road wheel(s) 18 propels the vehicle 12 toward the infrastructure node 11 and a display screen 22 connected thereto or collocated therewith. While the vehicle 12 is depicted in FIG. 1 as a passenger vehicle for illustrative purposes, other types of vehicles and other mobile platforms may be used within the scope of the disclosure, e.g., trucks, boats, motorcycles, bicycles, farm equipment, etc., without limitation. For marine applications in particular, the road surface 13 would be replaced with a body of water, with the infrastructure node 11, e.g., a roadside merchant as shown, possibly embodied as a dockside kiosk, floating raft, etc. For illustrative consistency, the vehicle 12 will be described below in its representative construction as a passenger motor vehicle without limiting its construction to such an embodiment.

In a possible use scenario, a driver/operator of the vehicle 12 of FIG. 1 may wish to transact with a potentially distant merchant or service provider via a dynamic and transient interaction with the infrastructure node 11. For instance, the operator may wish to purchase goods or services, or possibly obtain access to a toll-based roadway, bridge, parking garage, or other access-restricted location. To that end, the vehicle-mounted camera 16 (described in singular terms hereinafter solely for illustrative consistency) may be automatically focused on the display screen 22 in the distance ahead of the vehicle 12. The display screen 22 may be securely connected to and/or collocated with the infrastructure node 11 as noted above.

As part of the vehicle-merchant transaction considered herein, a merchant back office (not shown), server, or other goods or services provider may display a quick response (QR) code 24 on the display screen 22. To complete the transaction, the camera 16 is operable for discovering the QR code 24 in the field of vision/camera focus area of the camera 16, zooming in on the QR code 24, and thereafter scanning/reading multiple frames of the QR code 24. However, distance and motion of the vehicle 12 relative to the infrastructure node 11 and display screen 22 may complicate the scanning process and reduce its accuracy, possibly requiring several scanning attempts or "re-scans". The present teachings are therefore provided as a solution that is embodied as computer-readable instructions to be executed by a camera control system 25 of the vehicle 12 to improve the effectiveness and accuracy of a QR code-based vehicle-merchant transaction performed by the vehicle 12 and the infrastructure node 11.

Referring to FIG. 2, the camera control system 25 in a possible implementation includes one or more processors (P) 26 and a non-transitory computer-readable storage medium ("memory") (M) 27. The camera (CAM) 16, e.g., a high-resolution complementary metal-oxide-semiconductor (CMOS) sensor-based camera, may be panned or tilted in some constructions using the camera motor 160, which in turn is responsive to motor control signals ($CC_{160}$), e.g., to adjust a pan or tilt setting of the camera 16. The camera 16 communicates digital images in the form of camera data ($CC_{16}$) to the processor 26, e.g., via a hardwired or wireless connection. The memory 27 includes non-transitory storage media/devices (read only, programmable read only, solid-state, random access, optical, magnetic, etc.). The memory 27, on which computer-readable instructions embodying a method 100 (FIG. 3) and various sub-methods 200, 300, and 400 (FIGS. 4, 8, and 9, respectively) as described below, is capable of storing instructions in the form of one or more software or firmware programs or routines, combinational logic circuit(s), input/output circuit(s) and devices, signal conditioning and buffer circuitry and other components that can be accessed by one or more processors to provide a described functionality.

Additionally with respect to the camera control system 25, input/output circuit(s) and devices include analog/digital converters and related devices that monitor inputs from sensors, with such inputs monitored at a preset sampling frequency or in response to a triggering event. Software, firmware, programs, instructions, control routines, code, algorithms, and similar terms mean controller-executable instruction sets including calibrations and look-up tables. The camera control system 25 executes control routine(s) to provide desired functions. Ultimately, the camera control system 25 outputs a parameter control signal (arrow $CC_O$) to adjust one or more parameters or functions of the vehicle-mounted camera 16.

To implement the present solutions, the infrastructure node 11 of FIG. 1 may be equipped with a sensor suite 26 operable for detecting relative positions between the vehicle 12 and the display screen 22 on which the QR code 24 is ultimately displayed. Resident sensors of the sensor suite 26 may include, by way of example and not of limitation, infrastructure cameras, lidar sensors, radar sensors, ultra-wide band (UWB) sensors, etc. To facilitate onboard processing via the camera control system 25, the vehicle 12 be configured to use, e.g., 5G cellular, a WiFi link, BLU-ETOOTH™, Bluetooth Low-Energy (BLE), etc., or other suitable wireless communication protocols such as the IEEE 802.11 protocols, Worldwide Interoperability for Microwave Access (WiMAX), etc.

As illustrated schematically in FIG. 2, a human-machine interface (HMI) 29 may be used as part of the camera control system 25 or may be placed in communication with the processor 26 thereof. For instance, a vehicle infotainment system (not shown) may display icons or text prompts to a driver of the vehicle 12 regarding upfront QR code scanning activity. If the vehicle 12 is not in an optimal position but soon will be, the processor 26 may cause the HMI 29 to display a "searching" icon, e.g., a magnifying glass or other intuitive icon, or a "system processing" icon or text message. If the vehicle 12 has missed the optimal positions and driver intervention becomes necessary, the HMI 29 may alert the driver to that fact via appropriate icons, text, or other indicia, e.g., "Manual Scanning Required", perhaps coupled with an icon of a handheld smartphone for added clarity.

When the vehicle 12 of FIG. 1 is in motion relative to the infrastructure node 11 and the camera 16 attempts to scan/read a displayed QR code 24 located in front of and possibly at an angle with respect to the vehicle 12, several factors are accounted for herein to help optimize the scanning task. For instance, while the camera 16 may be able to perceive aspects of the QR code 24 at a great distance, the distance may be too great and/or the QR code 24 may be at too pronounced of an approach angle for the camera 16 to accurately perceive and decode it. Likewise, resolution of the camera 16 may be too low depending on the distance/approach angle. While QR codes have embedded special patterns to help reduce distortion and alignment to the patterns, problems may still arise when attempting to view and scan the QR code 24 from an angle. For instance, pixel resolution is significantly reduced at greater distances/angles, which in turn causes QR code reading failures.

To address these and other potential performance problems in the vehicle-merchant transaction scenario of FIG. 1, the camera control system 25 of FIG. 2 is configured to achieve successful scanning of the QR code 24 via selective tuning of parameters of the camera 16 and a real-time health check of the generated QR code 24. Additionally with respect to optional crowdsourced locations for scanning the QR code 24, the camera control system 25 is made aware of better/more feasible locations, e.g., the optimal placement region 20 of FIG. 1, for accurately acquiring QR code readings. In such embodiments, the method 100 described below may include receiving crowdsourced data indicative of prior scanning locations of the QR code 24, processing the crowdsourced data via the processor 26 of the camera control system 25 to determine the optimal placement region 20 of the vehicle 12, and ultimately controlling the state of the vehicle 12 such that the vehicle 12 is autonomously or manually directed to the optimal placement region 20.

Figure 3:
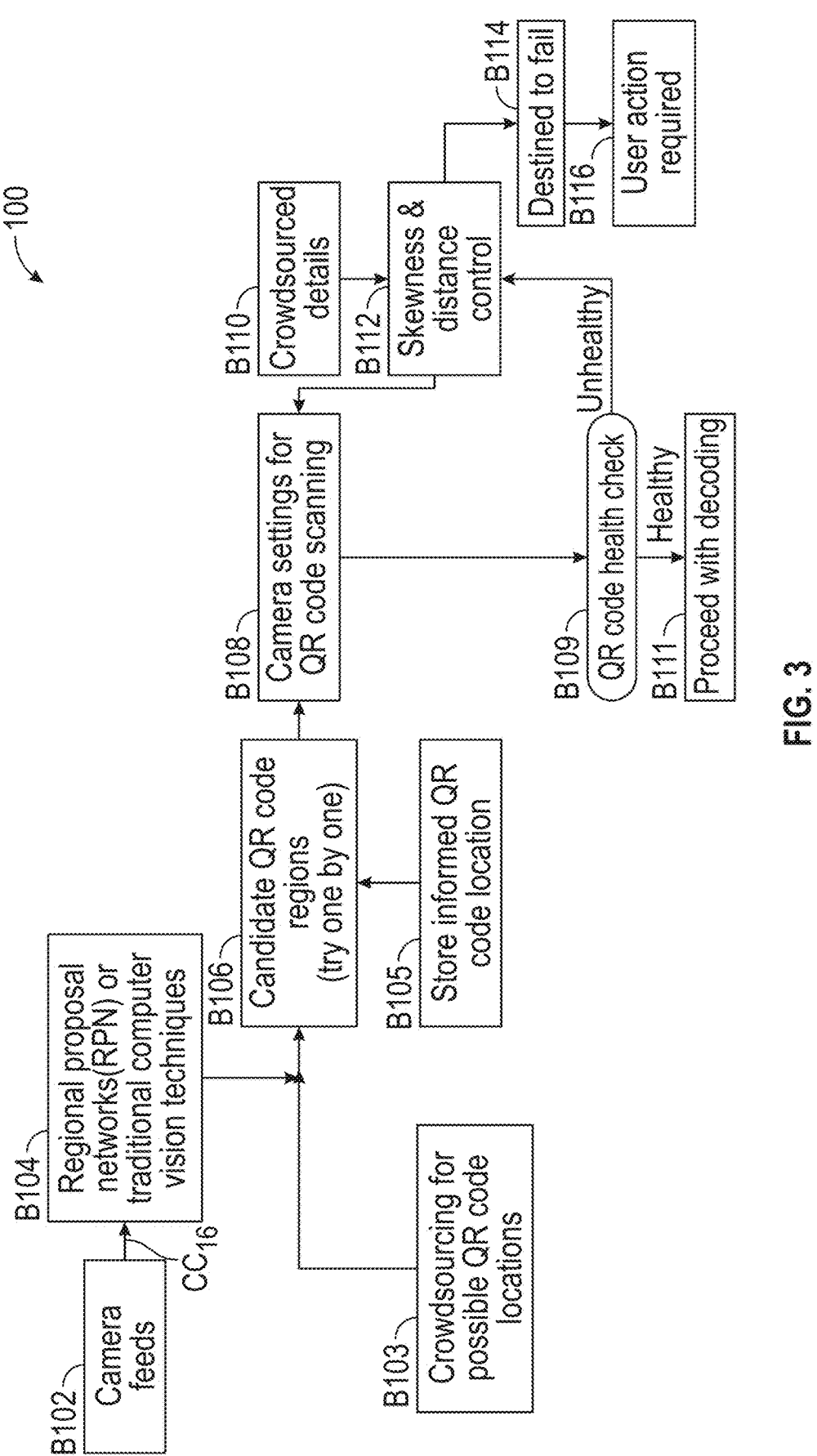
FIG. 3 is a flow chart describing a method for QR code discovery as an aspect of the present strategy.

Referring to FIG. 3, a method 100 is shown for scanning of the QR code 24 during a vehicle-merchant transaction. Performance of the method 100 enables the camera control system 25 of the vehicle 12 shown in FIG. 1 to accurately discover the QR code 24. The method 100 may be embodied as computer readable instructions and recorded in memory 27 of the camera control system 25 shown in FIG. 2. For illustrative clarity, the method 100 is described in terms of code segments or logic blocks each executable by the processor 26 to cause the camera control system 25 to perform the described functions. Block B102-B106 collectively describe initial work that the camera control system 25 performs, with the remaining blocks B108-B116 being performed based on results, clarity, skewness, and other factors.

In general, execution of the method 100 by the camera control system 25 of FIG. 2 includes collecting camera data ($CC_{16}$) of the QR code 24 when the QR code 24 of FIG. 1 displayed on the display screen 22 of infrastructure node 11. This action occurs using the camera 16 while the vehicle 12 is in motion relative to the display screen 22/infrastructure node 11. The processor 26 of the camera control system 25 shown in FIG. 1 processes the camera data ($CC_{16}$) to determine characteristics thereof. The camera control system 25 also performs a multi-factor health check of the QR code 24 and executes a control action of the camera 16 and/or the vehicle 12 in response to a value of one or more of the characteristics being less than a corresponding threshold of the multi-factor health check.

Figure 4:
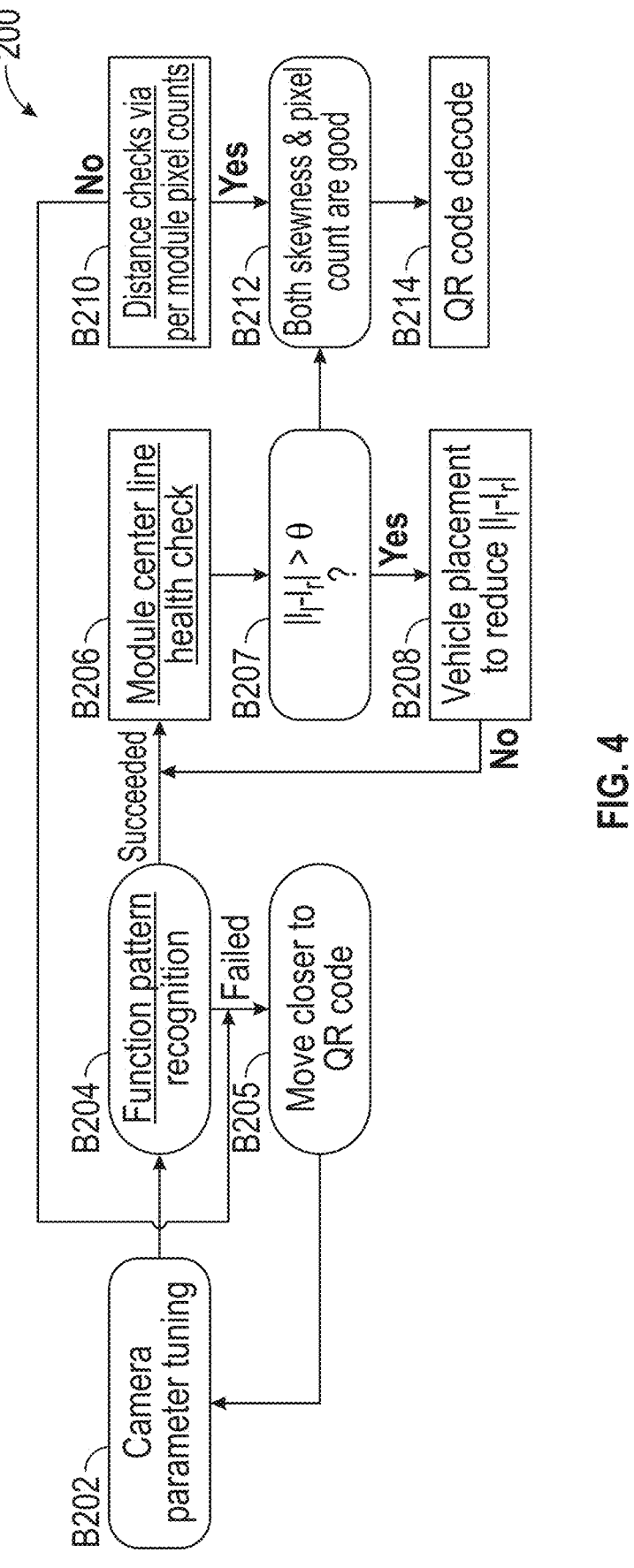
FIG. 4 is a flow chart describing a method for optimal vehicle placement when using a vehicle-mounted camera to scan a displayed QR code.
Figure 5:
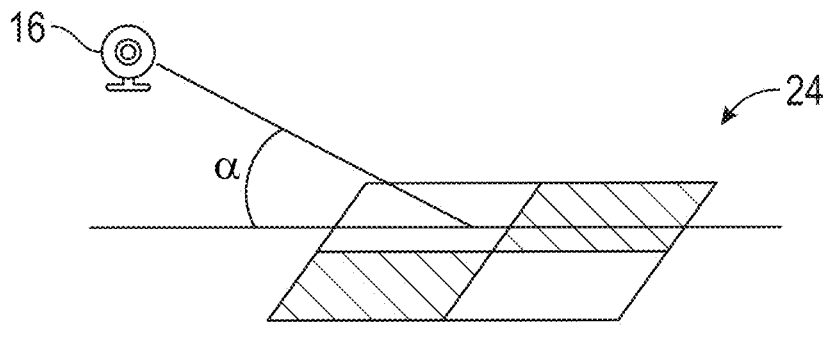
FIGS. 5 and 6 illustrate aspects of a displayed QR code considered by the camera control system in the course of performing the present method.
Figure 6:
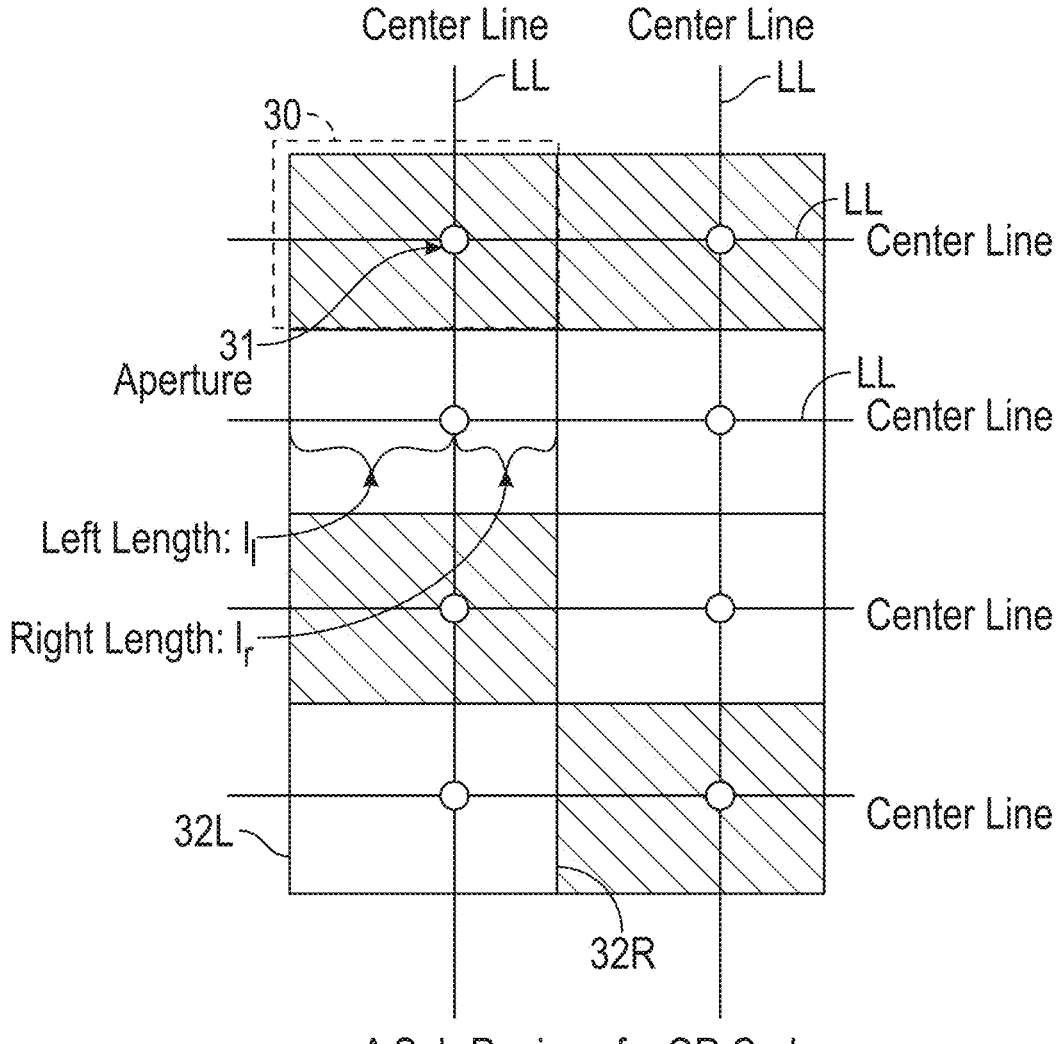

The aforementioned health check results in one of two actions: (1) when the collected camera data ($CC_{16}$) is not sufficiently clear, the camera control system 25 may automatically tune one or more camera settings of the camera 16, for instance using the method 400 of FIG. 9. If center lines (LL) of a displayed QR code 24 are severely skewed relative to a threshold, as illustrated in FIGS. 5 and 6, the camera control system 25 may instead tune the position of the vehicle 12 relative to the display screen 22 of FIG. 1. When the vehicle 12 is configured as an autonomous vehicle 12, e.g., fully autonomous or self-driving, this may occur autonomously, such as by autonomously controlling a steering and/or propulsion state of the autonomous vehicle via the processor 26 of FIG. 2, e.g., when a viewing angle exceeds a viewing angle threshold. Alternatively, the method 100 may include causing the change in the location of the vehicle 12 relative to the QR code 24 by prompting a driver of the vehicle 12, via the HMI 29 of FIG. 2, to change a steering and/or propulsion state of the vehicle 12. Such actions in essence help the vehicle 12 or other mobile host system gradually enter the optimal placement region 20 of FIG. 1, as described below with respect to FIGS. 4, 7A-C, and 8.

Commencing at block B102 of FIG. 3, the method 100 includes receiving and transmitting the camera data ($CC_{16}$) as a set of camera feeds, via the camera 16. The camera data ($CC_{16}$) includes digital pixel images of the QR code 24 (FIG. 1) from the camera 16 as the vehicle 12 travels toward the infrastructure node 11. The camera data ($CC_{16}$) is then provided as an input to block B104 for vision processing.

Block B103 entails using optional crowdsourcing for possible selection of QR code locations as candidates for the optimal placement region 20 along the road surface 13 of FIG. 1. Referring briefly to FIG. 1, the camera control system 25 may seek to locate a particular area or zone to use as the optimal placement region 20. Thus, embodiments may be considered in which the camera control system 25 uses historical data from prior drive-through events to determine candidate regions for this purpose. Block B103 may include providing such historical data as an input to the method 100, in this instance to block B106.

Block B104 includes processing the camera data ($CC_{16}$) from block B102 via a computer vision module or using a suitable object detection algorithm. For example, block B104 may entail using a Regional Proposal Network (RPN) to generate proposals of regions of interest for extracting potential candidate regions in the camera data ($CC_{16}$). The method 100 proceeds after transmitting results of block B104 to block B106.

Block B105 entails storing informed QR code locations for previously scanned QR codes 24, e.g., locations used several times over a particular duration. The locations are then provided to block B106 as an input.

At block B106, the method 100 of FIG. 3 may process the outputs of blocks B103, B104, and B105 to generate a set of candidate QR code regions for further consideration. For instance, the camera control system 25 may determine possible locations for the optimal placement region 20 of FIG. 1. The set of candidate QR code regions are provided to block B108 as an output of block B106.

At block B108, the method 100 next includes adjusting one or more camera settings for optimal QR code scanning for a real-time scanning event, doing so for each of the candidate QR code regions as the vehicle 12 travels toward and through the regions. In general, if the camera data ($CC_{16}$) is unclear relative to a calibrated standard, the camera parameters are tuned at block B108. The method 100 then proceeds to block B109 to proceed with a QR code health check in accordance with the disclosure. Block B108 also receives an input from block B112 as set forth below. A representative method 400 for adjusting the camera settings is described below with reference to FIG. 9.

Block B109 includes performing a multi-factor QR code health check. As alluded to above, block B109 may entail evaluating two criteria against calibrated thresholds: (1) clarity of the camera data ($CC_{16}$), and (2) "skewness" or angular orientation of center lines (LL) of the QR code module 30 (see FIG. 6). If the camera control system 25 determines that both criteria have been satisfied, the method 100 proceeds to block B111. The method 100 proceeds in the alternative to block B112 when the camera control system 25 determines that one or both of the criteria have not been satisfied. An embodiment of the multi-factor health check is illustrated in FIG. 4 as method 200 and described in further detail below.

With continued reference to the method 100 of FIG. 3, block B110 includes collecting crowdsourced details as a form of guided QR code discovery. For example, for every successful scanning of a QR code 24 by another vehicle 12, i.e., of a plurality or fleet of vehicles 12 when visiting the infrastructure node 11, the current settings of the respective camera 16 of the vehicles 12 may be shared. Successful historical scan details in a crowdsourced scenario may include, by way of example and not of limitation, a time of scan, store name/location, QR code details, and vehicle details. The QR code details may include, e.g., three-dimensional (3D) location and pose of the displayed QR code 24, skewness of the QR code 24 at the location of a successful scan, and per-module pixel count at the location of the successful scan.

Vehicle details in turn may include, e.g., camera parameters, three-dimensional pose of the vehicle 12/camera 16, specific make/model of the camera 16, global positioning system (GPS) location of the vehicle 12 at the location of the successful scan, etc. Collectively, the crowdsourced information acts as a guide to the camera control system 25 regarding whether the QR code 24 of FIG. 1 is too far away from the camera 16, too high, too low, or otherwise not optimally placed for successful scanning. The method 100 proceeds to block B112 once the crowdsourced details are received.

Block B111 is reached from block B109 after a successful multi-factor health check. In this case, the camera control system 25 may proceed with decoding of the QR code 24 and completion of the QR code-assisted vehicle-merchant transaction.

At block B112 of FIG. 3, the camera control system 25 responds to the unsuccessful multi-factor health check at block B109 with selective skewness and distance control, as required. For instance, if the vehicle 12 is located too far away from and/or at too pronounced of an approach angle with respect to the displayed QR code 24 to successfully complete the scan, the camera control system 25 may perform skewness and distance control, for instance in accordance with the representative method 300 of FIG. 8.

At block B114, the camera control system 25 may determine that the QR code scanning process is destined to fail regardless of the actions taken in block B112. In other words, the camera control system 25 may evaluate the severity of the skewness or the distance to the QR code 24 and treat extreme skewness/distance as corresponding to the "destined to fail" condition. When this occurs, the camera control system 25 may set a bit code in its memory 27 (FIG. 2) and proceed to block B116.

At block B116, the camera control system 25 may prompt an operator of the vehicle 12 that user action is required. For example, the camera control system 25 may present a message via an infotainment system screen (not shown) located in an interior of the vehicle 12, possibly with instructions to use a camera of a smartphone or another QR code scanning device to scan the QR code 24. The method 100 is finished when the scan is successfully performed using the alternative means.

QR CODE MULTI-FACTOR HEALTH CHECK: Referring now to FIG. 4, a method 200 is illustrated that may be used to perform block B109 of FIG. 3. Beginning with block B202, analogous to block B108 of FIG. 3, the camera control system 25 may commence tuning of parameters of the camera 16 as the vehicle 12 approaches the QR code 24.

The method 200 then proceeds to block B204 where the camera control system 25 performs a function pattern recognition process. As appreciated in the art, QR codes like the QR code 24 of FIG. 1 have a variety of patterns that collectively enable encoded functionality. Such patterns include (1) finder or positioning patterns that help localize the QR code, (2) alignment patterns to help the camera 16 successfully read the QR code 24 from skewed angles, (3) timing patterns to help divide data modules of the QR code into a grid system, and a quiet zone bordering the rest of the QR code 24, which helps separate the QR code 24 from interference from its surrounding environment. The method 200 proceeds to block B205 when the function patterns are not recognized at block 204, and to block B206 in the alternative when the function patterns are successfully recognized.

Block B205 includes waiting for the vehicle 12 to move closer to the QR code 24 and returning to block B202, thereafter repeating block B202 as described above.

Block B206 includes initiating a health check of a module center line, i.e., a check for skewness, with each module being a subregion of the full QR code 24 as appreciated in the art.

Referring briefly to FIG. 5, the QR code 24 may be arranged at a viewing angle (α) relative to the camera 16 as the vehicle 12 of FIG. 1 approaches the infrastructure node 11 of FIG. 1. This arrangement causes square shapes of the QR code 24 to appear as non-standard shapes, e.g., diamonds or elongated rectangles.

FIG. 6 illustrates the effects of skewness on centerline lines LL for each module 30 of the QR code 24, which would appear as being offset from a true center of the given module 30. Each module 30, normally has a square shape when the QR code 24 is viewed directly, i.e., without skew, appears as an elongated rectangle due to the viewing angle (α) of FIG. 5. Within each module 30 is an aperture 31 that, in a normal/orthogonal view, i.e., a non-skewed view, would sit at the very center of a (square) module 30. However, the apertures 31 of FIG. 6 are instead offset from the respective left and right edges 32L, 32R by a respective distance, i.e., lengths $l_l$ and $l_r$. This may lead to inaccurate QR code scanning results. Health checks may be used for QR codes, such as by comparing two colors to determine if they are the same: (i) a color of the aperture 31, and (ii) a color of the surrounding module 30 of the aperture 31. If the two colors fall on the same end of a histogram, the module 30 is deemed "healthy". If the colors fall on opposite ends of the histogram's spectrum, the module 30 is deemed "unhealthy". The method 200 proceeds to block 207 once the health check has started.

At block B207, the camera control system 25 may compare the offset to a threshold (θ) to determine whether the skewness requires vehicle placement correction. In FIG. 4, the absolute value of the left and right offset of the centerlines LL (FIG. 6) is compared to such a threshold, i.e., $|l_l - l_r| > \theta$. The method 200 proceeds to block B208 when the threshold (θ) is exceeded, with the method 100 proceeding in the alternative to block B212 when the threshold (θ) is not exceeded.

At block B208, the camera control system 25 may prompt the driver of the vehicle 12 to move the vehicle 12 to a new location to reduce the offset from block B207. Block B208 may be performed autonomously in other implementation, e.g., when the vehicle 12 is autonomously operated. As a possible feature, the camera control system 25 may track the offset and automatically decode the QR code 24 when the offset is less than the threshold (θ).

Figure 7A:
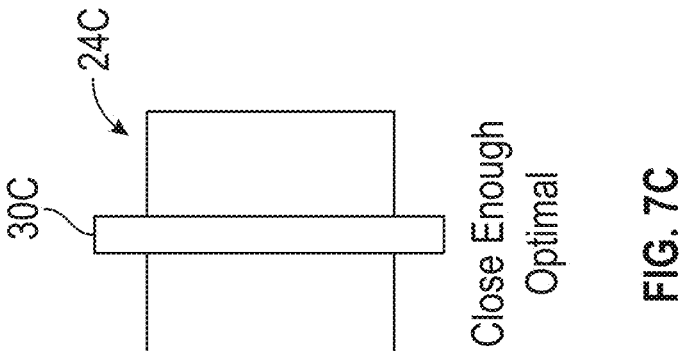
FIGS. 7A, 7B, and 7C illustrate relative far, medium, and close distances between the vehicle-mounted camera and the displayed QR code in accordance with an aspect of the disclosure.
Figure 7B:
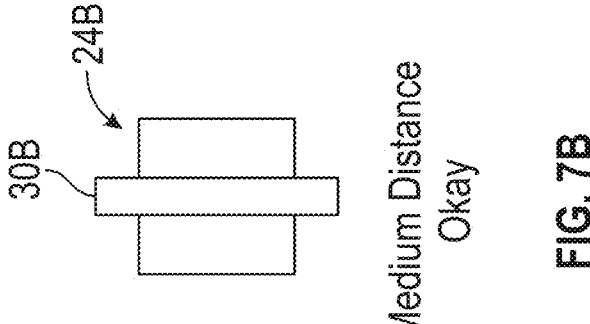
Figure 7C:
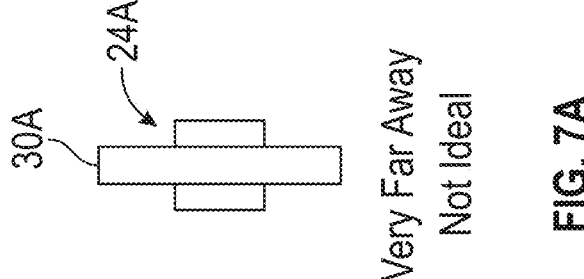

Block B210 of FIG. 4 includes performing a distance health check. Referring briefly to FIGS. 7A, 7B, and 7C, the QR code 24 at a given instant may be located far from the camera 16 (FIG. 7A), at a medium distance from the camera 16 (FIG. 7B), or close to the camera 16 (FIG. 7C). The farther away a QR code 24 is from the camera 16, the smaller the QR code 24 appears to be in the frame of reference of the camera 16, which in turn translates to fewer occupied pixels. Assuming the view is not skewed, the distance between the camera 16 and the QR code 24 may still require parameter tuning for optimal scanning performance.

In each of the respective distance cases of FIGS. 7A, 7B, and 7C, respective pixel bars 30A, 30B, and 30C represent the width of a single pixel. Thus, the same object located farther away requires fewer pixels in a given image. For the most distant example of FIG. 7A, however, the QR code 24 appears too small relative to the pixel width 30A, making accurate scanning of the QR code 24 difficult. FIGS. 7B and 7C present progressively more scannable area of the QR code 24, thus improving scanning results.

In block B210, therefore, the camera control system 25 may look to pixel counts to see if sufficient pixels are visible to the camera 16. If sufficient pixels are visible, the method 200 may proceed to block B212, with the method 200 otherwise returning to block B205.

At block B212, the camera control system 25 may register a bit code indicating that skewness and pixel count are good/sufficient for accurate scanning of the QR code 24. The method 200 then proceeds to block B214, where the camera control system 25 decodes the QR code 24 and proceeds with the vehicle-merchant transaction.

DISTANCE TREATMENT: Placement of the vehicle 12 relative to the display screen 22/infrastructure node 11 of FIG. 1 may be handled in accordance with an exemplary method 300 within the scope of the method 100 of FIG. 3. The camera control system 25 may determine how many modules 30 (FIG. 6) are in the QR code 24 of version (v). As understood in the art, the QR code version ranges from 1 to 40 and describes the size and data capacity of the QR code 24. For instance, version 1 is the smallest at 21 modules×21 modules, while version 40 is the largest (177× 177). The QR code version (v) thus describes the overall gride size, maximum data storage capacity, and other information. The module count (C) is thus version-specific, i.e., $C = 4v + 17$.

Figure 8:
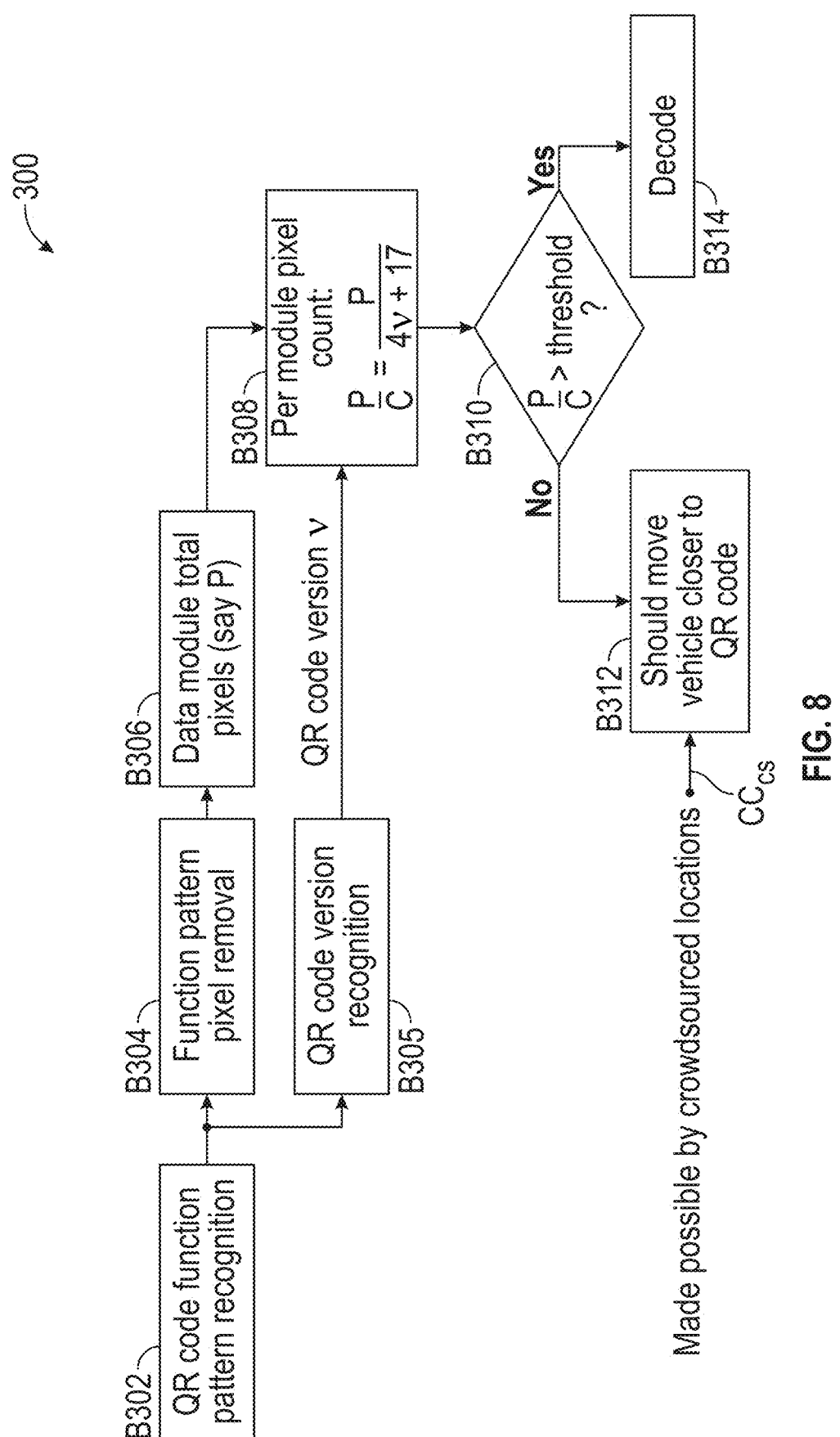
FIG. 8 is a flow chart describing a method for vehicle placement as another aspect of the present strategy.

Referring to the method 300 of FIG. 8, block 302 may entail using the camera control system 25 to perform a function pattern recognition process. This block is analogous in its function to block B204 of FIG. 4 as described above. The method 300 proceeds to blocks B304 and B305 once the function patterns are recognized.

Block B304 includes removing pixels associated with the function patterns of block B302. Block B304 may entail, e.g., creating a digital mask around function pattern pixel locations and zeroing/disregarding masked pixels during data decoding. In this manner, data modules 30 are better isolated. The method 300 then proceeds to block B306.

Block B305 includes determining the QR code version (v), which as appreciated in the art is presented as part of the QR code 24 itself. The method 300 then proceeds to block B308.

At block B306, the camera control system 25 records a value (P) describing the total remaining number of pixels in the data module 30 after removing the function patterns at block B304. The method 300 thereafter proceeds to block B308.

Continuing with the discussion of FIG. 8, block B308 entails calculating a per-module pixel count, i.e., $$\frac{P}{C},$$

as a function of the QR code version (v). Implementation of block B308 may include using the processor 26 (FIG. 2) to calculate this value as follows:

$$\frac{P}{C} = \frac{P}{4v + 17}$$

Where once again, v is the QR code version, P is the remaining number of pixels in the data module 30 after removing the function patterns at block B304, and C is the module count, i.e., 4v+17 as noted above. The method 300 thereafter proceeds to block B310.

At block B310 of FIG. 8, the camera control system 25 determines whether the per-module pixel count, i.e., $$\frac{P}{C},$$

is sufficiently high. Block B310 may include comparing the calculated value of the per-module pixel count to a predetermined threshold. The method 300 proceeds to block 312 when the per-module pixel count is less than the threshold and to block B314 in the alternative when the per-module pixel count equals or exceeds the threshold.

Block B312 includes determining, via the camera control system 25, that the vehicle 12 should move closer to the QR code 24. The decision at block B312 in one or more embodiments may be informed by crowdsourced data 35, e.g., from block B110 of FIG. 3. Control responses resulting from block B312 may include waiting an appropriate duration before repeating method 300, and possibly alerting a driver of the vehicle 12 of FIG. 1 that the QR code 24 is not yet close enough. Autonomous embodiments of the vehicle 12 may automatically control the camera 16 and vehicle 12 to the same effect. The method 300 is complete once the vehicle 12 has been moved to a more optimal location for scanning.

Block B314 includes decoding the QR code 24 via the processor 26 when the per module pixel count exceeds a predetermined per module pixel count threshold. Decoding as appreciated in the art involves performance of various image processing techniques by the processor 26 of FIG. 2, or more likely a dedicated image processor of the camera 16. Such techniques may include, e.g., noise removal, edge detection, pixel value extraction, error correction, etc., followed by conversion of binary data to a machine-readable format and interpreting encoded information. In the representative scenario of FIG. 1, decoding may result in initiation/completion of a vehicle-merchant transaction such as ordering of goods or services, paying of a bridge or road toll, etc.

The method 300 is complete once the QR code 24 has been decoded.

Figure 9:
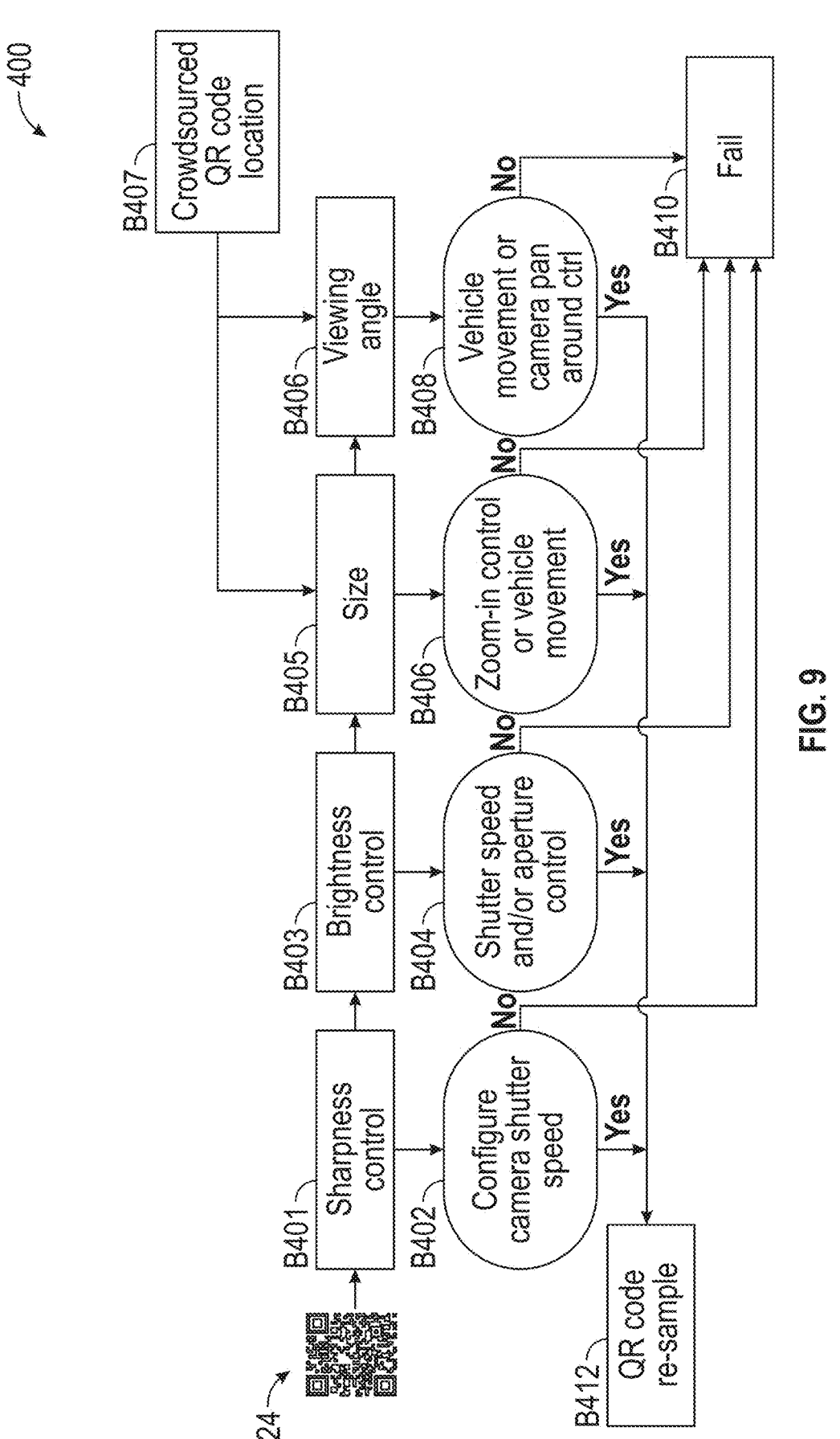
FIG. 9 is a flow chart describing aspects of a method for tuning settings of a vehicle-mounted camera aboard the vehicle of FIG. 1.

TUNING OF CAMERA PARAMETERS: Referring to FIG. 9, a method 400 for adjusting or tuning camera parameters may be used in one or more embodiments to implement block B108 of the method 100 illustrated in FIG. 3. In general, if the camera data ($CC_{16}$) of FIG. 2 is unclear, one or more parameters may be tuned in real-time.

Beginning with block B401, once the QR code 24 has been scanned by the camera 16 of FIG. 1, the camera control system 25 may perform one or more of the following blocks B401 (sharpness control), B403 (brightness control), B405 (size), and B406 (viewing angle) to initiate tuning of one or more parameters. As noted above, and as performed at block B407, some of the parameter adjustments, e.g., size and viewing angle, may be adjusted in one or more embodiments using crowdsourced QR code location information. Blocks B401, B403, B405, and B406 proceed to respective blocks B402, B404, B406, and B408.

Block B402 is arrived at from block B401 (sharpness control), and thus may entail configuring the shutter speed of the camera 16 of FIGS. 1 and 2. Shutter speed depends on ambient lighting conditions and other factors such as the length of the lenses used by the camera 16. By increasing or decreasing shutter speed as needed, the camera control system 25 may alter exposure times and minimize image blur. The method 400 thereafter proceeds to block B412.

Block B404 is arrived at from block B403 (brightness control), and thus may entail configuring the shutter speed and/or aperture size of the camera 16 of FIGS. 1 and 2. Various adjustments may be used to increase or decrease image brightness, e.g., by changing the size of the aperture, gamma correction, histogram equalization, shutter speed, etc. The method 400 thereafter proceeds to block B412.

Block B406 is arrived at from block B405 (size), and thus may entail adjusting digital and/or optical zoom level of the camera 16 of FIGS. 1 and 2. Alternatively or concurrently, block B406 may include controlling movement of the vehicle 12 or prompting the driver of the vehicle 12 to continue driving for a predetermined duration or distance before resampling the QR code 24. The method 400 thereafter proceeds to block B412.

Block B408 is arrived at from block B406 (viewing angle), and thus may entail controlling movement of the vehicle 12 or prompting the driver of the vehicle 12 to continue driving for a predetermined duration or distance before resampling the QR code 24. Alternatively, or concurrently, block B408 may include controlling a pan setting of the camera 16 to change the viewing angle, and then transmitting a camera control signal to the camera motor 160 of the camera 16 when the camera 16 is so equipped. The method 400 thereafter proceeds to block B412.

At block B412 of FIG. 9, the camera control system 25 may resample or rescan the QR code 24, then continue from block B108 (FIG. 3) based on the results of the re-scan.

The above-described methods 100 and its supporting methods 200, 300, and 400 may be used onboard the vehicle 12 of FIG. 1 to achieve accurate QR code scanning using the vehicle's camera suite, e.g., one or more of the cameras 16. The teachings selectively enable real-time tuning of camera parameters and a health check of infrastructure-generated QR codes during drive-through/drive-by vehicle-merchant transactions. Such adjustments may be coupled with optional autonomous driving control actions or HMI-based driver prompts for correcting a position of the vehicle 12 relative to the infrastructure node 11. Moreover, the solutions are optimized using crowdsourcing so that the camera control system 25 may identify correct scanning locations for accurately scanning and decoding the QR code when displayed by the infrastructure node 11. These and other attendant benefits of the present teachings will be appreciated by those skilled in the art now having the benefit of the foregoing disclosure.

The present disclosure is susceptible of embodiment in many different forms. Representative examples of the disclosure are shown in the drawings and described herein in detail as non-limiting examples of the disclosed principles. To that end, elements and limitations described in the Abstract, Introduction, Summary, and Detailed Description sections, but not explicitly set forth in the claims, should not be incorporated into the claims, singly or collectively, by implication, inference, or otherwise.

For purposes of the present description, unless specifically disclaimed, use of the singular includes the plural and vice versa, the terms "and" and "or" shall be both conjunctive and disjunctive, "any" and "all" shall both mean "any and all", and the words "including", "containing", "comprising", "having", and the like shall mean "including without limitation". Moreover, words of approximation such as "about", "almost", "substantially", "generally", "approximately", etc., may be used herein in the sense of "at, near, or nearly at", or "within 0-5% of", or "within acceptable manufacturing tolerances", or logical combinations thereof.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims. Moreover, this disclosure expressly includes combinations and sub-combinations of the elements and features presented above and below.

What is claimed is:

1. A method for scanning of a quick response (QR) code during a vehicle-merchant transaction, comprising:
   collecting camera data of the QR code using a camera mounted to a vehicle when the QR code is displayed on a display screen of an infrastructure node and the vehicle is in motion relative to the display screen;
   transmitting the camera data to a processor of a camera control system;
   processing the camera data via the processor of the camera control system to determine characteristics of the camera data;
   performing a multi-factor health check of the QR code using the characteristics of the camera data, the multi-factor health check of the QR code including determining a skewness or angular orientation of the QR code; and
   executing a control action of the camera and/or the vehicle in response to the skewness or angular orientation of the QR code being less than a corresponding skewness or angular orientation threshold of the multi-factor health check.

2. The method of claim 1, wherein performing the multi-factor health check of the QR code additionally includes evaluating a clarity of the camera data, and wherein executing the control action includes adjusting a setting of the camera to optimize the scanning of the QR code.

3. The method of claim 2, wherein adjusting the setting of the camera includes adjusting one or more of a sharpness setting, a brightness setting, or a size setting.

4. The method of claim 3, the method including adjusting the sharpness setting or the brightness setting, wherein executing the control action includes adjusting a shutter speed of the camera.

5. The method of claim 3, the method including adjusting the size setting, wherein executing the control action includes adjusting a zoom level of the camera.

6. The method of claim 1, wherein executing the control action includes adjusting a pan setting and/or a tilt setting of the camera.

7. The method of claim 6, wherein adjusting the pan setting and/or the tilt setting of the camera includes transmitting a motor control signal to a camera motor of the camera via the processor.

8. The method of claim 6, wherein executing the control action includes causing a change in a location of the vehicle relative to the QR code.

9. The method of claim 8, wherein the vehicle is an autonomous vehicle, and wherein causing the change in the location of the vehicle relative to the QR code includes controlling a steering and/or propulsion state of the autonomous vehicle via the processor.

10. The method of claim 8, wherein causing the change in the location of the vehicle relative to the QR code includes prompting a driver of the vehicle, via a human-machine interface, to change a steering and/or propulsion state of the vehicle.

11. The method of claim 1, further comprising:
   receiving crowdsourced data indicative of prior scanning locations of the QR code;
   processing the crowdsourced data via the processor of the camera control system to determine an optimal placement region of the vehicle; and
   controlling the state of the vehicle such that the vehicle is directed to the optimal placement region.

12. The method of claim 1, further comprising:
   determining a QR code version of the QR code via the processor;
   calculating a per module pixel count as a function of the QR code version; and
   decoding the QR code via the processor when the per module pixel count exceeds a predetermined per module pixel count threshold.

13. A camera control system for scanning of a quick response (QR) code during a vehicle-merchant transaction, comprising:
   a vehicle-mounted camera;
   a processor; and
   a computer storage medium ("memory") on which is recorded instructions that are executable by the processor to cause the camera control system to:
      collect camera data of the QR code via the vehicle-mounted camera when the QR code is displayed on a display screen of an infrastructure node and a vehicle having the vehicle-mounted camera is in motion relative to the display screen;
      process the camera data via the processor to determine characteristics of the camera data;

perform a multi-factor health check of the QR code using the characteristics of the camera data, including determining a skewness or angular orientation of the QR code; and execute a control action of the camera and/or the vehicle in response to skewness or angular orientation of the QR code being less than a corresponding skewness or angular orientation threshold of the multi-factor health check.

14. The camera control system of claim 13, wherein the multi-factor health check additionally includes determining a clarity of the camera data, and wherein the instructions are executable by the processor to cause the camera control system, as the control action, to adjust a setting of the vehicle-mounted camera to optimize the scanning of the QR code, the setting including a sharpness setting, a brightness setting, or a size setting.

15. The camera control system of claim 13, wherein the instructions are executable by the processor to cause the camera control system, as the control action, to adjust a pan setting and/or a tilt setting of the vehicle-mounted camera.

16. The camera control system of claim 13, wherein the instructions are executable by the processor to cause the camera control system, as the control system, to cause a change in a location of the vehicle relative to the QR code, including causing the camera control system to request a change in a steering and/or propulsion state of the vehicle via the processor.

17. The camera control system of claim 16, further comprising:

a human-machine interface (HMI), wherein the instructions are executable by the processor to cause the camera control system, as the control system, to prompt a driver of the vehicle, via the HMI, to change a steering and/or propulsion state of the vehicle.

18. A vehicle comprising:

a vehicle body;

a set of road wheels connected to the vehicle body; and a camera control system operable for scanning of a quick response (QR) code during a vehicle-merchant transaction between the vehicle and an infrastructure node, the camera control system comprising:

a vehicle-mounted camera;

a processor; and a computer storage medium ("memory") on which is recorded instructions that are executable by the processor to cause the camera control system to:

collect camera data of the QR code via the vehicle-mounted camera when the QR code is displayed on a display screen of an infrastructure node and the vehicle is in motion relative to the display screen;

process the camera data via the processor to determine characteristics of the camera data;

perform a multi-factor health check of the QR code using the characteristics of the camera data, including performing (i) a check of clarity of the image data, and (ii) a check of a skewness or angular orientation of the QR code;

execute a control action of the camera by adjusting one or more settings of the camera to optimize the scanning of the QR code in response to the skewness or angular orientation of the QR code being less than a corresponding skewness or angular orientation threshold of the multi-factor health check.

19. The vehicle of claim 18, wherein the vehicle-mounted camera includes a camera motor operable for controlling a pan level and/or a tilt level of the vehicle-mounted camera, and wherein the instructions are executable by the processor to cause the camera control system to adjust a pan setting and/or a tilt setting of the vehicle-mounted camera via the camera motor.

20. The vehicle of claim 18, wherein the vehicle is configured as an autonomous vehicle, and wherein the instructions are executable by the processor to cause an autonomously controlled change in a location of the vehicle relative to the QR code.

* * * * *